FREQUENCY SYNTHESIZER APPARATUS
Filed May 31, 1968
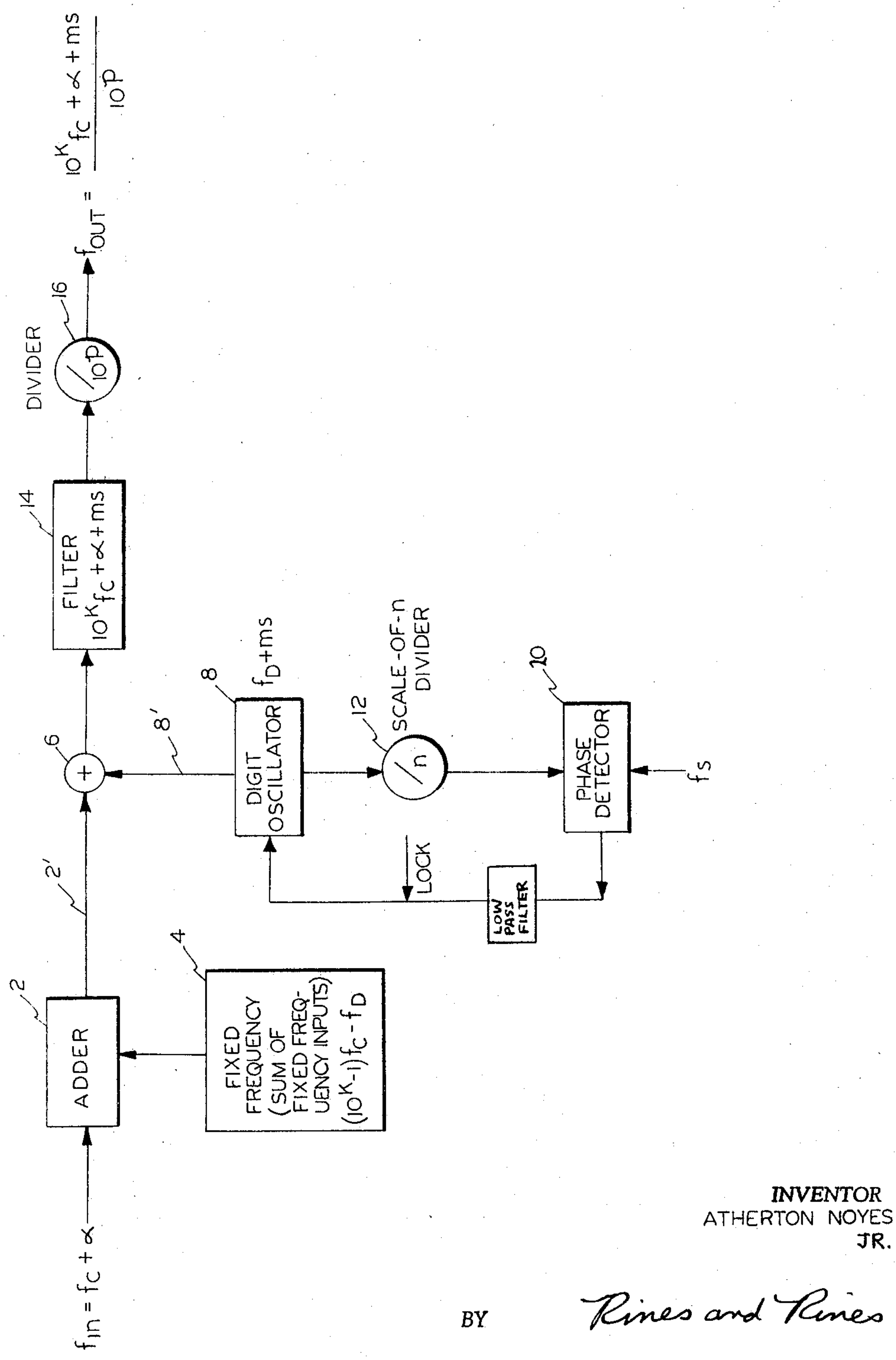
INVENTOR
ATHERTON NOYES
JR.
BY Rines and Rines
ATTORNEYS 3,509,483
Patented Apr. 28, 1970

3,509,483

FREQUENCY SYNTHESIZER APPARATUS

Atherton Noyes, Jr., Concord, Mass., assignor to General Radio Company, West Concord, Mass., a corporation of Massachusetts Filed May 31, 1968, Ser. No. 733,592
Int. Cl. H03b 3/04
U.S. Cl. 331—22 10 Claims

ABSTRACT OF THE DISCLOSURE

This disclosure relates to frequency synthesizing apparatus having capability of essentially infinitely fine frequency resolution in which an input signal, a fixed frequency and a digit-selecting frequency are added to produce a sum frequency for further processing so as to produce a desired output frequency, and wherein the control of the digit-selecting frequency is effected with the aid of a scale-of-*n* preset divider and phase comparator for selectively locking the digit-selecting frequency.

The present invention relates to frequency synthesizer apparatus and, more particularly, to apparatus of the general class described in my prior United States Letters Patent No. 3,300,731, issued Jan. 24, 1967, wherein an input signal, a fixed frequency and a digit-selecting frequency are added to produce a sum frequency for further processing so as to produce a desired output frequency, and with synthesis effected by repetitive additions and divisions of frequency in substantially identical circuit groups, termed digit insertion units, each enabling a choice of any number from zero to nine as a digit in a multidigit decimal number defining the desired synthesized output frequency, and employing as many digit insertion units as desired in tandem to produce a predetermined degree of fineness of resolution in the synthesized output frequency. For the purposes of further discussion, this kind of synthesis will be called the "add and divide" type.

More specifically, in frequency synthesizer apparatus of the type described in said patent, an input frequency foi each of a plurality of "digit insertion units" (such input frequency lying between, say, 5 and 5.1 mHz.), a fixed standard frequency of, for example, 42 mHz., and the output frequency of a digit-selecting oscillator selectably locked to one of ten available standard-frequency "pickets" spaced at 100 kHz. intervals from 3 to 3.9 mHz., as an illustration, are added to produce a frequency situated between 50 and 51 mHz. This frequency is divided by ten, to produce a new frequency, again lying between 5 and 5.1 mHz., which can be used as the input frequency for succeeding digit insertion units in a train of such units. Each unit in the train supplies one digit in a multidigit number defining the desired output frequency, as explained in the referenced patent. Each input frequency $f_{in}$ may be considered to consist of an invariant "carrier" component $f_c$ and an information-bearing component, $\alpha$.

In other variations of this basic principle, the "digit-selecting frequency" delivered to the final mixer is taken, by cross bar switching, from a ten-line matrix carrying on each line one of the required ten frequencies. Or, in another popular method, a digit oscillator may be locked to successive harmonics of the pulse repetition rate of a standard frequency pulse-train by conventional stroboscopic sample-and-hold techniques. The basic principle, however, is the same; namely, the adding of an input frequency (which carries digit information from earlier circuits), a standard frequency and a digit-selecting frequency selectable in ten steps, and the division by ten of the resulting sum frequency. The sum frequency is about ten times the input frequency, as the result of the addition of large standard-frequency components. If the digit information on the input signal is represented by $\alpha_1$ (so that $f_{in}=5$ mHz.$+\alpha_1$ in the example), and the inserted digit information is represented by $10\beta_1$ (so that the "digit-selecting frequency" $=3.0+10\beta_1$), then the sum frequency is $5+\alpha_1+42+3+10\beta_1=50+\alpha_1+10\beta_1$; this sum frequency being now divided by ten to produce an output frequency $$f_{out}=5+\frac{\alpha_1}{10}=\beta_1$$

If this signal is now used as the input to a succeeding digit insertion unit in which the inserted digit information is denoted by $10\beta_2$, then by similar analysis the output of this succeeding unit is $$f_{out}=5+\frac{\alpha 1}{100}+\frac{\beta_1}{10}+\beta_2$$

It will be seen from the foregoing that the action of each digit insertion unit is to insert new digit information, and to reduce the relative rank of the incoming digit information by ten; i.e., the decimal point has been shifted one place in the number denoting the incoming frequency, and a new digit has been inserted in the vacated position. It should be observed, however, that the final division by ten is only a matter of convenience, so that the output frequency will roughly be the same as the input frequency and therefore suitable as an input signal to an identical digit insertion unit. At the end of a train of digit insertion units, it is obviously not necessary to perform this division if, for example, an output frequency in the range from 50 to 51 mHz. is desired. The final digit insertion unit (without divider) will insert its digit in normal fashion, at a rank one decade higher than the highest rank of information in the incoming signal. For this principle of repetitive return to the same "carrier" component $f_c$ to work, it is necessary that the total added fixed-frequency component shall be nine times the fixed-frequency "carrier" component (5 mHz.) of $f_{in}$, so that after division by ten, the "carrier" component will be restored to its original value. For complete frequency coverage without hiatus, it is necessary that the maximum available magnitude $\alpha$ of the information-carrying portion of the incoming signal to any digit insertion unit shall approach in size a unit step S in the digit-selecting frequency of that unit. When $\alpha$=S, one complete unit step is supplied by the incoming signal. The addition of a fixed frequency which is exactly nine times the incoming "carrier" frequency is necessary, therefore, only if output division by ten is included, and provided that it is essential to return to the orignal carrier frequency. If, indeed, some other standard frequency is added (not 9 $f_c$), the only result will be to translate the synthesized frequency (consisting of carrier and information-carrying offset) to some new frequency region. Thus "carrier repetition" is not necessary. The only necessary requirement is that $0\leqq\alpha\leqq S$ at each digit insertion point, so that verier control through each discrete step can be achieved.

As previously stated, we define the above synthesizing principle as the "add and divide" method. As described in the referenced patent, it is also "carrier repeating" in that the "carrier" component $f_c$ (5.0 mHz. in the example) repeats at the output of each digit insertion unit. Carrier repetition, however, is not essential to the general method.

From the preceding discussion, it follows that, mathematically, it is possible to construct a digit insertion unit to insert two or more digits. The requirement for a carrier-repeating two-digit unit, for instance, would be that the added fixed-frequency component must be 99 times as great as the "carrier" of the input signal, and that output division by 100 be included. Using the numbers of the earlier example, a 2-digit insertion unit would be described by:

$$f_{sum}=5+\alpha+495+100\beta$$
$$=500+\alpha+100\beta$$

Or, using a ten times lower "carrier" frequency:

$$f_{sum}=0.5+\alpha+49.5+100\beta$$
$$=50+\alpha+100\beta$$

To produce an iterative train of identical 2-digit insertion units, it would obviously be necessary to divide the sum frequency by 100 to get back to the starting frequency level again.

Extension of this concept to 3-digit insertion units, and higher, is obvious. The problem to which the present invention is primarily directed, however, arises in the consideration of how to insert 100, 1000, or more discrete stabilized steps in the digit-selecting frequency input to the final mixer. Quite evidently the oscillator locked to a standard frequency picket fence, as described in said patent, would not be practical if there were 100 pickets spaced 10 kHz. or 1000 pickets spaced 1 kHz. in the 3- to 4-mHz. interval. It would not only be impossible to avoid sometimes locking on the wrong picket, but spurious phase modulation resulting from the presence of closely spaced neighboring pickets would become intolerable. While an alternate scheme described above for deriving digit frequencies—the switching to the cross-bar lines each carrying one and only one "picket frequency—could be made to work, the practical difficulty of generating, filtering, isolating and selectively switching 100, 1000 or more individual standard frequencies is obviously so great as to make this approach unattractive.

For these reasons, no modern synthesizer operating on this basic add and divide principle inserts more than one decade of digits in a given set of frequency-selecting circuits. An object of the present invention, accordingly, is to provide an improved frequency synthesizer apparatus of this type in which the above limitations are obviated and in which two, three, four or more decades can practically be inserted and controlled by a single set of circuits, termed "decade generator" for purposes of explanation herein. In this invention the principle of "carrier repetition" is adhered to only when benefit results.

A further object is to provide a novel frequency synthesizer of more general application as well.

Other and further objects are described hereinafter and are more particularly pointed out in the appended claims. In summary, however, the ends of the invention are attained by controlling one or more of the digit oscillators of an "add and divide," synthesizer to insert two or more decades of digit control. The digit selecting frequencies are coherently locked to the master oscillator of the system with the aid of scale-of-$n$ presettable dividers and phase detectors for selectively locking the digit selecting frequency, at chosen frequency intervals S, and maintaining equality between the step size S and the total range of the information component $\alpha$ of the input signal, and in providing means for shifting the rank of the information component of the input signal to permit insertion, contiguously and without overlap, of new inforamaion.

Other well-known synthesis methods use frequency multiplication of a relatively low reference or "step" frequency by the process of division, in a presettable counter, of the frequency of an output oscillator, and phase-lock of the output oscillator by phase comparison of the divided frequency and the low-frequency standard reference frequency. If the preset counter gives one output pulse to the phase detector for $n$ input pulses from the output oscillator, it is clear that the output frequency is "$n$" times the reference frequency. Such synthesizers, using counters presettable to any required value of "$n$" are sometimes called "scale-of-$n$" synthesizers. In such synthesizers, the minimum step size is equal to the reference frequency, and fine resolution cannot be achieved in the output frequency since, as the standard reference frequency $f_s$ is made smaller in such systems to attain finer resolution, the time required for the phase-lock loop to achieve capture soon reaches unacceptably large values. In addition, in such systems, the output frequency signal becomes degraded as the division ratio icnreases and any phase-jitter unavoidably present in the standard reference frequency appears, multiplied by $n$, in the output frequency.

In the present invention, the "scale-of-$n$" synthesizing principle is employed as a part of an "add and divide" synthesizer in a way which obviates the above-noted limitations, and results in major simplification of such a (potentially) infinite resolution synthesizer.

A plurality of "scale-of-$n$" locked oscillators are employed, not as output oscillators but as digit oscillators.

Employed in this way, the limited resolution of a "scale-of-$n$" locked oscillator is reduced to any desired fineness of resolution by subsequent division in the "add and divide" synthesizer. And by the same token, this subsequent division suppresses any phase jitter in the final output due to the phase jitter of the low-frequency step-reference frequency by a factor equal to the subsequent division ratio. Preset "scale-of-$n$" dividers are readily programmable; so the synthesizer output frequency is easily controlled by external logic circuits, or by simple manual switches, as desired.

The invention will now be described with reference to the accompanying drawing the single figure of which is a block diagram of a generalized circuit constructed in accordance with a preferred embodiment of the invention.

Referring to the generalized circuit of the drawing, the input frequency $f_{in}$ is shown applied to an adder 2 which, in the generalized case for successive decade generators is also fed one or more coherent fixed frequency inputs 4 derived from, for example, a single master oscillator generator, later discussed. The adder may contain one or more frequency mixers, to achieve the frequency addition. The input $f_{in}$ is represented by the previously specified relationship $f_{in}=f_c+\alpha$. A digit-adding mixer 6 is shown receiving a sum-frequency output of the adder 2 at 2' and the digit-selecting frequency at 8' from a digit oscillator 8. Instead of the ten-step digit oscillator of said patent which was controlled by a phase detector to which the "picket fence" standard frequency components of, for example, 3.0, 3.1 . . . 3.9 mHz. were applied, the present invention employs a scale-of-$n$ divider 12 between the digit oscillator 8 and the phase detector 20. To the phase detector 20 is applied a standard frequency $f_s$ coherently derived from the master oscillator or generator, where $f_s$ is equal to the desired step size in the digit oscillator. With the phase detector 20 selectively locking the digit oscillator 8 in this circuit, as indicated, the digit selected frequency resulting from the digit oscillator 8 will be $f_D+mS$, where $m$ is the integer number of the selected step of frequency interval $S$, and $f_D$ is the digit oscillator frequency for $m=0$. If $k$ represents, in a decimal-based synthesizer, the number of digit decades to be controlled, then the condition obtains that $0\leqq m\leqq(10^k-1)$. The digit-selecting oscillator, with output frequency equal to $f_D+mS$, will thus become selectively locked at any chosen one of $10^k$ equally spaced frequencies coherently related to the fixed master, standard frequency, from $f_D$ to $$f_D+(10^k-1)S$$

inclusive. The fixed frequency inputs to the adder 2 may for the sake of this example be defined as totalling $(10^k-1)f_c-f_D$, and the variable input to adder 2 is $f_c+\alpha$, so that the sum frequency from adder 2 is $(f_{sum})_2=10^kf_c-f_D+\alpha$. The sum frequency from adder 6 then becomes $(f_{sum})_6=10^kf_c+\alpha+mS$.

Receiving the sum-frequency output of the mixer 6 is a filter 14 that, in accordance with the invention, is tuned to $10^k f_c + \alpha + mS$; and its output is, in turn, divided by a divider 16 providing division ratio or factor $$10^{\rho}$$

where $\rho$ is the $\log_{10}$ of the desired output division ratio. This results in the decade generator output frequency $f_{out}$ given by $$\frac{10^k f_c + \alpha + mS}{10^{\rho}}$$

Note that if $\rho = k$, the decade generator will be "carrier repeating" in that $f_c$ at the output is equal to $f_c$ at the input; if $k \neq \rho$, but both are integers, the carrier frequency level will change, in one or more decade steps, between input and output.

In any given decade generator the value of $k$ (the number of digit decades to be controlled) may be selected arbitrarily, as may the 0-digit frequency, $f_D$, of the digit oscillator.

The value of $\rho$, on the other hand, is not freely chosen but is determined by the selected step size, $S_2$ (say) in the next succeeding decade generator. The maximum available $\alpha$ for the next decade generator will evidently be $$(\alpha_2)_{max} = \frac{(\alpha_1)_{max} + (m)_{max} S_1}{10^{\rho}} = \frac{\alpha 1_{max} + (10^{k1} - 1) S_1}{10^{\rho}} = \frac{10^{k1} S_1}{10^{\rho_1}}$$

Since $(\alpha_2)_{max} = S_2$, by the principle explained earlier, $$S_2 = \frac{10^{k1} S_1}{10^{\rho 1}};\ \text{or}\ \frac{10^{k1}}{10^{\rho 1}} = \frac{S_2}{S_1}$$

Thus, with varying step sizes $(S_2 \neq S_1)$, $\rho_1$ is not equal to $k_1$ and the carrier is *not* repeating.

$$(f_c)_2 = \frac{10^{k1}}{10^{\rho 1}} f_{c1} = \frac{S_2}{S_1} f_{c1}$$

In a complete synthesizer, advantage may be taken of the fact that at the start of the train of decade generators, the input signal has no digit information component, but consists of a "carrier" component $f_c$ only. Referring to the drawing, $\alpha = 0$ for this initial decade generator, and the serialized circuit may be simplified as follows. Adder 2 may be omitted and the inputs to the mixer 6 becomes a fixed standard start frequency, $f_{start} = (f_{sum})_6 - f_D$ at 2' and $(f_D + mS)$ at 8', and the filter 14 will be tuned to $10^k f_c + \alpha + ms (= f_{sum} + ms)$, where $f_{sum}$ may be selected arbitrarily.

As a specific illustration, using the frequency ranges before discussed, for an initial four-decade generator with $f_D = 3$ mHz. and with output division by a factor of 100 at the divider 16, the input at 2' may be 47 mHz. and the phase detector standard frequency input $f_s$ may be 100 Hz. The scale-of-*n* divider 12 will enable the digit oscillator 8 to produce digit-selecting frequencies from, say, 3 to 3.9999 mHz. in 10,000 steps spaced by 100 Hz. This reflects a variation in *n* in the divider 12 from a minimum of 30,000 (for $m=0$) to a maximum of 39,999 (for $m=9999$). The filter 14 will then be tuned to 50–50.0000 mHz. and the output frequency after division $f_{out}$ will be 0.5–0.509999 mHz., with output carrier level $f_c = 0.5$ mHz., for input to a succeeding decade generator.

As another example, a typical two-decade generator controlling digits 0 to 99 ($k=2$) constructed in accordance with the invention intended to follow the four-decade generator just discussed, and having output division at 16 by a factor of 10, ($\rho=1$), would be represented as follows: The initial input will be the four-digit decades in 10,000 steps of 1 Hz., from 0.5 to 0.509999 inclusive, controlled by the four-decade generator just described; and this may, for example, be added in a first mixer in adder 2 to a 4.5 mHz. standard frequency to produce a first sum frequency in the adder 2 of 5–5.009999 mHz.

In the adder 2 may be included a second mixer for adding to this the fixed frequency of 42 mHz. to produce an input 2' for the mixer 6 of 47–47.009999 mHz. In this case, the maximum $\alpha$ is 9.999 kHz. which must correspond with the step size in digit oscillator 8. For 100 steps of control between 3 and 3.99 mHz., this step size will be 0.01 mHz. or 10 kHz. Therefore, 10 kHz. is applied as $f_s$ to the phase detector 20. The scale-of-*n* divider 12 will have a minimum division factor *n* of 300 and a maximum of 399, producing at 8' digit selecting frequencies of from 3.0 to 3.99 in steps of 10 kHz. With the filter 14 tuned to 50–51 mHz. and, as before stated, the divider 16 having a division factor of 10, the output frequency from the two-decade generators in tandem has six decades of resolution, ($10^6$ steps). The output frequency ranges from 5.0 to 5.099, 999, 9 mHz. in steps of 0.1 Hz. In this second decade generator, the carrier frequency at the output is $f_c = 5$ mHz. Such output carrier level is correct for driving a subsequent one-decade generator of the type herein described, if such should be desired as a continuation of the synthesis process. Since output division by only 10 is used in this example, instead of division by a ratio equal to the number of insertable steps (100), the unit is not "carrier repeating," ($f_c = 0.5$ at input, 5.0 at output).

In accordance with the invention, thus, frequency synthesizers are adapted to have almost infinite resolution with comparatively few digit controlling elements. It is apparent, moreover, that a variety of decade generators of the invention can be constructed using identical central-core circuits, and differing only in relatively minor detail, such as the range of the divide-by-*n* ratio, and the choice of output division. Such variants of the basic decade generator can, moreover, be combined in different applications to produce synthesizers having characteristics tailored to specific requirements. As another illustration, an eight-decade synthesizer can be assembled from two four-decade generators at relatively low cost and in small space, as a minor variant on the six-decade result described above. Alternatively, a ten-decade synthesizer can be readily assembled from a four-decade, a three-decade, a two-decade and a one-decade generator. This would have fast programming for the larger frequency steps, and relatively slower programming for the small steps, where, in general, high speed is not needed. A wide variety of synthesizers can thus be assembled in accordance with the invention from a relatively small number of decade generator components.

Suitable apparatus for use in this system includes, for example, scale-of-*n* frequency divider as described, for instance, in United States Patent No. 3,050,685 to R. W. Stuart, Jr., Aug. 21, 1962, or in the article by R. W. Stuart, Jr., entitled "A High-Speed Digital Frequency Divider of Arbitrary Scale," appearing on pages 52 through 57 of part 10, Instrumentation and Industrial Electronics, Convention Record of the Institute of Radio Engineers, 1954; and phase detectors, or balanced modulators, such as, for instance, Model M–5–B, double balanced mixer, manufactured by Relcom of Mountain View, Calif., or other well-known types of phase detectors such as those operating on the sampling, by the scale-of-*n* divider output, of a linear ramp with repetition frequency of $f_s$. Other well-known components of similar function may also, of course, be employed, as may apparatus of the type described and referenced in my said patent.

The various "standard" frequencies mentioned herein are, of course, derived coherently from a single master frequency to which all frequencies are arithmetically related. Using the frequencies employed in the several concrete illustrations given herein, for example, we may assume a master frequency of 10 mHz., derived from a crystal-controlled oscillator which may, in turn, be phase locked if desired to a primary frequency standard, such as a cesium beam, or a hydrogen maser.

The reference frequencies $f_s$ used to lock the digit oscillators may readily be derived, by a simple division process, from the standard frequency. 10 kHz.=10 mHz./1000, for instance, and by a further division (conveniently by digital techniques) 100 Hz.=10 kHz./100.

$$42 \text{ mHz.} = 5 \times 10 \text{ mHz.} - \frac{8 \times 10 \text{ mHz.}}{10}$$

or $$42 \text{ mHz.} = 42 \times \frac{10 \text{ mHz.}}{10}$$

or $$42 \text{ mHz.} = \frac{8 \times 10 \text{ mHz.}}{2} + \frac{2 \times 10 \text{ mHz.}}{10}$$

Such multiplications, divisions, subtractions and additions of frequency are readily accomplished by well-known techniques.

It should be understood that while the particular frequencies used herein for purposes of illustration are preferred for considerations of good design practice in providing proper frequency ratios at the inputs to the several mixers to minimize the generation of high-order spurious frequencies, other satisfactory frequencies can also be selected by those skilled in the art. The invention, furthermore, is not limited to the decimal system of numbers but can clearly be used in a binary synthesizer, for instance, on similar principles, involving even simpler digital circuitry in the divider trains. Further modifications will occur to those skilled in the art and all such are considered to fall within the spirit and scope of the invention as defined in the appended claims.

What is claimed is:

1. Frequency synthesizer apparatus having, in combination, means for receiving an input signal, means for generating standard frequencies, adding means connected with the receiving and generating means for producing a first sum frequency, digit-selectable frequency means comprising digit oscillator means connected with scale-of-$n$ divided means and phase detector means for selectively locking the frequency of the oscillator means, means for applying a standard step-reference frequency to said phase detector means, said phase detector means locking said digit oscillator means at a predetermined one of a plurality of equally spaced frequencies coherently related to said standard frequencies, further adding means connected with said first-named adding means and said digit-selectable frequency means for producing a second sum frequency, and means for dividing said second sum freqency by a predetermined factor, thereby to form an output signal.

2. Frequency synthesizer apparatus as claimed in claim 1 and in which the said input signal $f_{in}$ is given by the relationship $f_{in}=f_c+\alpha$, where $f_c$ is an invariant carrier component and $\alpha$ is an information-bearing component; the said digit oscillator means frequency is given by the relationship $f_D+mS$, where S represents the frequency step size, $m$ is an integer number of the selected step and $f_D$ is the digit oscillator means frequency at $m=0$; the said standard frequencies are represented by the relationship $(10^k-1)f_c-f_D$, where $k$ is the number of controllable decades to be used and satisfies the further relationship that $0 \leqq m \leqq (10^k-1)$; and wherein filter means is connected between said further adding means and said dividing means tuned to a frequency given by the relationship $(10^k f_c+\alpha+mS)$.

3. Frequency synthesizer apparatus as claimed in claim 2 and in which said dividing means is adjusted to have a division factor of $10^\rho$, where $\rho$ is the $\log_{10}$ of the desired output division ratio, the output frequency $f_{out}$ from said dividing means then being given by the relationship $$f_{out} = \frac{10^k f_c + \alpha + mS}{10^\rho}$$

4. Frequency synthesizer apparatus as claimed in claim 3 and in which means is provided for adjusting said output division ratio to be equal to the number of said steps, thereby to render the apparatus carrier-repeating.

5. Frequency synthesizer apparatus as claimed in claim 3 and in which means is provided for adjusting the said output division ratio to be unequal to the number of said steps, thereby to render the apparatus non-carrier-repeating.

6. Frequency synthesizer apparatus as claimed in claim 3 and in which substantially the following relationships obtain:

$\alpha=0$
first sum frequency=47 mHz.
step reference frequency=100 Hz.
$n$ minimum=30,000 for $m=0$
$n$ maximum=39,999 for $m=9999$
filter means frequency=50–50.9999 mHz.
$\rho=2$.

7. Frequency synthesizer apparatus as claimed in claim 3 and in which substantially the following relationships obtain:

$\alpha$ maximum=10 kHz.
first sum frequency=47–47.01 mHz.
step reference frequency=10 kHz.
$n$ minimum=300
$n$ maximum=399
filter means frequency=50–51 mHz.
$\rho=1$.

8. Frequency synthesizer apparatus as claimed in claim 3 and in which means is provided for adjusting the maximum information-bearing component $\alpha_{max}$ to approach in value the selected frequency step interval S.

9. Frequency synthesizer apparatus having, in combination, means for generating a standard frequency, digit-selectable frequency means comprising digit-oscillator means connected with scale-of-$n$ divider means and phase-detector means for selectively locking the frequency of the oscillator means, means for applying a standard step-reference frequency to said phase-detector means, said phase-detector means locking said digit-oscillator means at a predetermined one of a plurality of equally spaced frequencies coherently related to said standard frequency, adding means connected with said standard frequency generating means and said digit-selectable frequency means for producing a sum frequency, and means for dividing said sum frequency by a predetermined factor, thereby generating an output signal.

10. Frequency synthesizing apparatus as claimed in claim 1 connected in tandem with further similar frequency synthesizing apparatus such that the output signal of the first named frequency synthesizing apparatus serves as input signal to the said further frequency synthesizing apparatus.

No references cited.

JOHN KOMINSKI, Primary Examiner

U.S. Cl. X.R.

331—39